United States Patent [19]

Chlanda et al.

[11] Patent Number: 4,536,269
[45] Date of Patent: Aug. 20, 1985

[54] MULTICHAMBER TWO-COMPARTMENT ELECTRODIALYTIC WATER SPLITTER AND METHOD OF USING SAME FOR ACIDIFICATION OF AQUEOUS SOLUBLE SALTS

[75] Inventors: Frederick P. Chlanda, Rockaway; Krishnamurthy N. Mani, Denville, both of N.J.

[73] Assignee: Allied Corporation, Morris Township, Morris County, N.J.

[21] Appl. No.: 490,946

[22] Filed: May 2, 1983

[51] Int. Cl.³ ............................................. B01D 13/02
[52] U.S. Cl. ................................... 204/182.4; 204/301
[58] Field of Search ............................ 204/301, 180 P

[56] References Cited

U.S. PATENT DOCUMENTS 3,687,682  8/1972  Scheder ................. 204/180 P
4,238,305  12/1980  Gancy et al. ................. 204/301

Primary Examiner—John F. Niebling
Assistant Examiner—B. J. Boggs, Jr.
Attorney, Agent, or Firm—Gus T. Hampilos; Gerhard H. Fuchs

[57] ABSTRACT

An apparatus is disclosed for generating an acidified aqueous salt solution and an aqueous base in a multichamber two-compartment electrodialytic water splitter which comprises alternating bipolar and first cation permselective membranes and at least one additional substantially non-porous, water-swollen cation permselective or neutral membrane disposed between a cation face of the bipolar membrane and a face of said first cation membrane thereby defining at least two acid compartments and a base compartment positioned between an anode and a cathode. The method comprises the steps of: (a) introducing a liquid comprising water to the base introducing a liquid comprising an aqueous soluble salt to a first acid compartment adjacent the base compartment (c) serially transferring the liquid comprising the aqueous soluble salt from the first acid compartment to a second acid compartment adjacent the first acid compartment (d) passing direct current through said water splitter thereby adding hydrogen ions to the first and second acid compartments, metal cations from the acid compartments to the base compartment, and adding hydroxide ions to the liquid comprising water in the base compartment; (e) withdrawing a liquid comprising aqueous base from the base compartment; and (f) withdrawing an acidified aqueous soluble salt from the second acid compartment.

18 Claims, 14 Drawing Figures

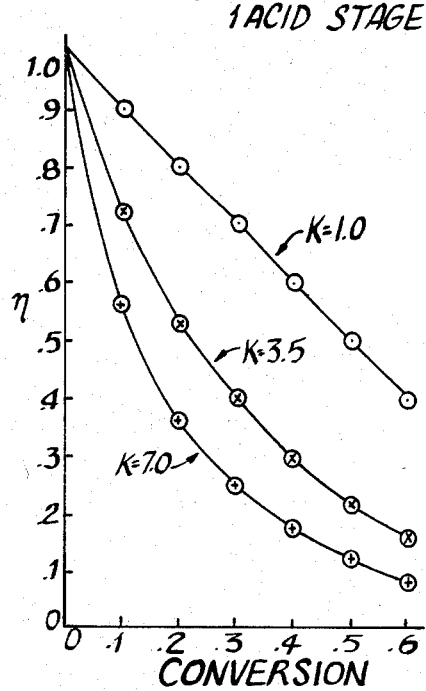
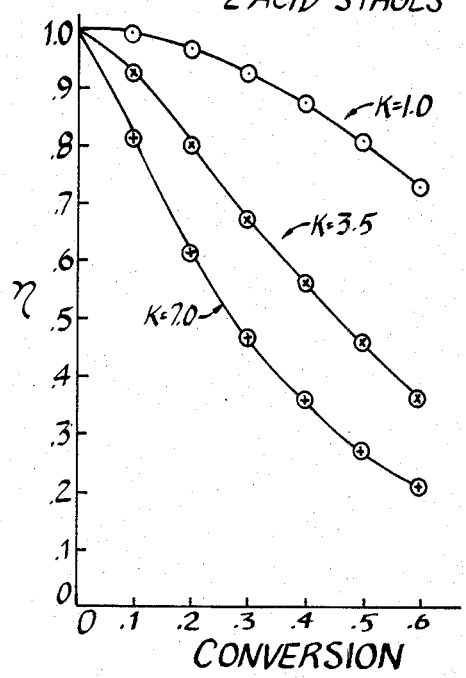
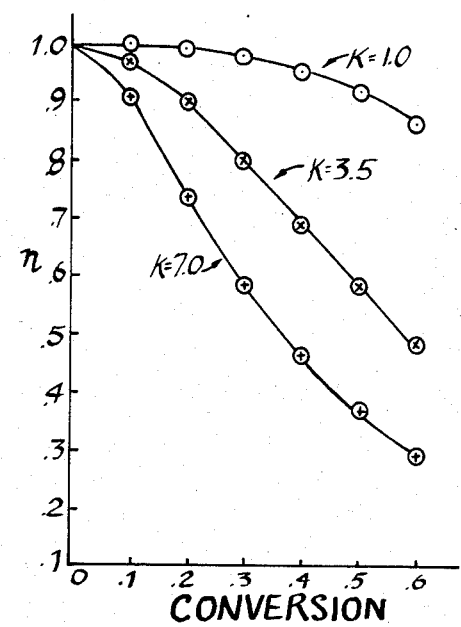

ETA vs. CONVERSION OF 20% $Na_2SO_4 \rightarrow NaHSO_4$ CURVE CIRCULATED BY $.963 + .0322C - .650C^2$

MULTICHAMBER TWO-COMPARTMENT ELECTRODIALYTIC WATER SPLITTER AND METHOD OF USING SAME FOR ACIDIFICATION OF AQUEOUS SOLUBLE SALTS

BACKGROUND OF THE INVENTION

The present invention relates to a multichamber acid compartment two-compartment electrodialytic water splitter and a method of using same to produce an aqueous soluble acidified salt solution and aqueous soluble base at increased current efficiency.

Electrodialytic water splitting in a two-compartment cell is well known. For example, U.S. Pat. No. 4,391,680 by the same inventors, discloses generation of strongly acidified sodium chloride and aqueous sodium hydroxide by two-compartment water splitting of aqueous sodium chloride. However, when generating strong acids in a two-compartment electrodialytic water splitter, the efficiency for acid generation falls rapidly as the concentration of acid in the acid compartment increases due to migration of hydrogen ions across the cation membrane from the acid compartment into the base compartment.

Various methods have been employed in the prior art in an attempt to overcome the decrease in current efficiency with increased acidity in the acid compartment. For example, a three-compartment electrodialytic water splitter comprised of alternating bipolar anion and cation permselective membranes thereby forming alternating acid, salt and base compartments is disclosed in our copending patent application Ser. No. 474,711, filed Mar. 14, 1983. In addition, the staging of two conventional two-compartment electrodialytic water splitters whereby the acidified salt solution withdrawn from the acid compartment of one two-compartment water splitter is fed to the acid compartment of a second two-compartment water splitter is disclosed in our U.S. Pat. No. 4,391,680. In an attempt to increase the efficiency of the bipolar membrane, U.S. Pat. No. 3,111,472 (Oda et al.) discloses disposing a microporous water permeable cation or neutral membrane in the acid and/or base compartments of a three-compartment electrodialytic water splitter. Oda et al. disclose feeding a brine solution to an acid compartment formed by a cation face of bipolar membrane, flowing the aqueous solution through the microporous water permeable membranes separating the acid compartments, and withdrawing an acidified brine solution from the acid compartment nearest the salt zone. However, the apparatus and method of Oda et al. does not overcome the lower efficiency due to migration of the hydrogen ions through the membranes into the salt and/or base compartments.

All of these prior art disclosures require installation of auxilliary equipment and separate additional process steps, both of which increase costs. In view of the foregoing, the industry has endeavored to develop a process capable of producing highly acidic aqueous brine at low cell voltage. To date, this had not been achieved.

SUMMARY OF THE INVENTION

In accordance with the present invention there is provided a method for generating an acidified aqueous salt solution and an aqueous base in a two-compartment electrodialytic water splitter having a plurality of unit cells comprised of a biopolar membrane, at least one substantially non-porous, water-swollen cation permselective or neural membrane, and a cation permselective membrane, wherein said at least one substantially non-porous, water-swollen cation permselective or neutral membrane is disposed between a cation face of said bipolar membrane and a face of said first cation membrane thereby forming a first acid compartment and at least one additional acid compartment non porous, water swollen cation permselective or neutral membrane and a base compartment positioned between an anode and a cathode, which comprises the steps of:

(a) introducing a liquid comprising water to a base compartment formed by an anion face of a bipolar membrane and a face of said cation membrane;

(b) introducing a liquid comprising an aqueous soluble salt to at least one additional acid compartment formed by the faces of said cation membrane and said at least one cation or neutral membrane;

(c) serially transferring the liquid comprising the aqueous soluble salt from said additional acid compartment to the first acid compartment formed by a face of at least one of said cation or neutral membranes and a cation face of a bipolar membrane;

(d) passing direct current through said electrodialytic water splitter thereby adding hydrogen ions to the first acid compartment, transferring hydrogen ions through at least one of said additional cation or neutral membranes from the first acid compartment to the said additional said additional acid compartment, metal cations from the acid compartment to the base compartment and adding hydroxide ions to the liquid comprising water in the base compartment;

(e) withdrawing a liquid comprising aqueous base from the base compartment; and (f) withdrawing an acidified aqueous soluble salt from the first acid compartment.

In addition there is also provided an improved apparatus for production of acidified aqueous soluble salt and aqueous soluble base having:

(a) cell container;

(b) a unit cell comprised of alternating bipolar cation permselective membranes thereby forming alternating acid and base compartments positioned between two electrodes;

(c) means to add liquid into each base compartment;

(d) means to withdraw liquid from each base compartment;

(e) means to add liquid into each acid compartment; and (f) means to withdraw liquid from each acid compartment, the improvement which comprises:

at least one substantially non-porous, water-swollen cation permselective or neutral membrane disposed between a cation face of the bipolar membrane and a face of the cation permselective membrane thereby forming a first acid compartment and at least one additional acid compartment and means to transfer liquid from at least one additional acid compartment to the first acid compartment, said first acid compartment being formed by a cation face of a bipolar membrane and a face of at least one substantially non-porous, water-swollen cation permselective or neutral membranes.

BRIEF DESCRIPTION OF THE DRAWINGS

FIG. 7 graphically displays the variation of overall current efficiency with increasing conversion for the prior art two-compartment electrodialytic water splitter of FIG. 1 for various cation permselective membranes and metal ions.

FIG. 8 graphically displays the variation of overall current efficiency versus conversion for the preferred embodiment of the present invention illustrated in FIG. 4.

FIG. 9 graphically displays the variation of overall current efficiency with increasing percent conversion for the preferred embodiment of the present invention illustrated in FIG. 3.

DETAILED DESCRIPTION OF THE INVENTION

Figure 1:
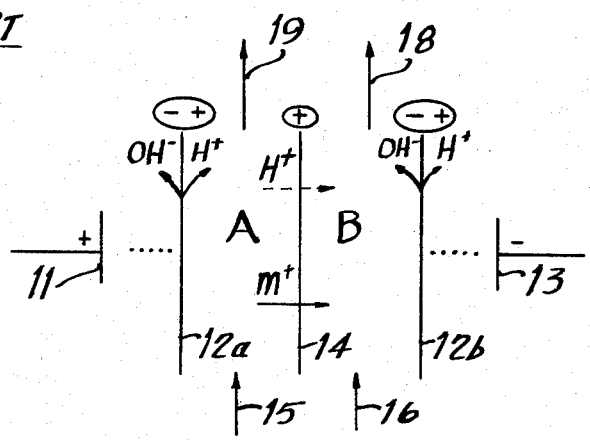
FIG. 1 schematically illustrates the ion transport in a conventional two-compartment electrodialytic water splitter of the prior art.
Figure 4:
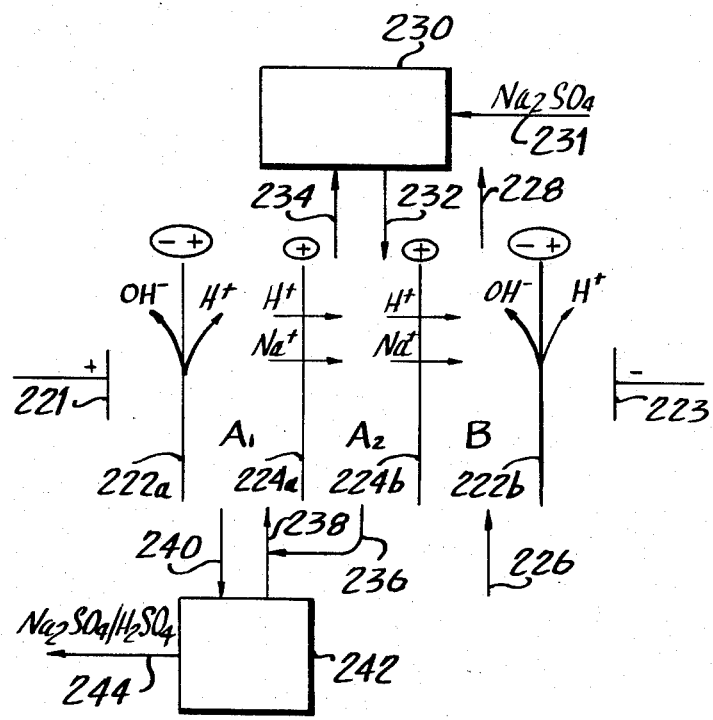
FIG. 4 schematically illustrates another preferred embodiment of the present invention employing two acid stage, two-compartment multichamber electrodialytic water splitter of the present invention.

The present invention provides a multichamber acid compartment two-compartment electrodialytic water splitter useful for the production of acidified aqueous salt solution that operates at a higher overall current efficiency than the two-compartment electrodialytic water splitters of the prior art and at higher overall current efficiency and lower cell voltage than the three-compartment electrodialytic water splitters of the prior art. A prior art two-compartment electrodialytic water splitter, as illustrated in FIG. 1 contains alternating bipolar and cation permselective membranes disposed between two electrodes thereby forming alternating acid and base compartments. The multichamber acid compartment two-compartment electrodialytic water splitter of the present invention (such as illustrated in FIG. 4) includes at least one additional substantially non-porous, water-swollen cation or neutral membrane disposed between a cation face of the bipolar and a face of the first cation permselective membrane thereby forming at least a first acid compartment, $A_1$, bounded by a cation face of the bipolar and a face of the substantially non-porous, water-swollen cation or neutral membrane and at least one additional acid compartment, $A_2$, bounded by another face of the substantially non-porous, water-swollen cation or neutral membrane and a face of the first cation permselective membrane bounding the base compartment. While the prior art desirably operated a two-compartment water splitter in the staging or batch recirculating mode, such staging or batch recirculation was often impractical especially when the acidified brine was fed to a continuous process. While three-compartment electrodialytic water splitters in the prior art were used to produce acidified brine, the anion membranes of the three-compartment electrodialytic water splitter are normally of higher resistance and more prone to failing than cation membranes. The multichamber acid compartment two-compartment electrodialytic water splitter of the present invention operates without need for staging and without anion membranes thereby providing higher overall current efficiency and lower average cell voltage than previously possible.

In accordance with a preferred embodiment of the present invention illustrated in FIG. 4, by feeding aqueous soluble salt to the at least one additional or second acid chamber, $A_2$, adjacent to the base compartment and nearest the anion face of the bipolar membrane, and by serially transferring aqueous soluble salt from $A_2$ to $A_1$ wherein hydrogen ion is added, an acidified aqueous salt solution may be produced and withdrawn from the first acid chamber, $A_1$, bounded by the cation face of the bipolar and a face of the substantially non-porous, water-swollen cation or neutral membrane. In this way, the present invention minimizes the neutralization of $H^+$ by $OH^-$ and thereby increases the overall efficiency for production of both $H^+$ and $OH^-$.

By the term "acidified brine" as used herein is meant an aqueous salt solution wherein at least about 1-50 percent by weight of the soluble salt MA has been converted into the corresponding monohydrogen acid HA, depending upon the degree of ionization thereof. The invention is particularly useful for production of acidified brine containing at least about 1-5% HCL (a highly ionized acid), or at least about 25-50% $NaHSO_4$ (a partially ionized acid) by conversion of for example, 1 molar NaCl solution into about 0.01 to 0.05 molar HCL/about 0.99-0.95 molar Nacl or by conversion of 1 molar $Na_2SO_4$ solution into about 0.25-0.50 molar $NaHSO_4$/0.75-0.50 molar $Na_2SO_4$, respectively.

The prior art two-compartment water splitter illustrated in FIG. 1 incorporates a plurality of cation 14 and bipolar ion exchange membranes 12a and 12b arranged in an alternating fashion between two electrodes 11 and 13 thus forming an electrodialysis stack.

Hydrogen ions produced by a bipolar membrane 12a are introduced into a salt solution MA so that an acidified salt solution is produced and withdrawn via line 19. The efficiency of the process is determined in part by the ratio of $H^+$ and $M^+$ crossing cation membrane 14. As the acidity of the salt solution is increased, more and more of the current will be carried across the cation membrane 14 by the H+, thereby causing a reduction in the efficiency η for acid and base production. The efficiency of the system may be represented by the following function:

$$\frac{1}{\eta} = \frac{K}{\eta_o} R + \frac{1}{\eta_o} \qquad \text{Eq. (1)}$$

Where $\eta$ is the current efficiency for $M^+$ transport, R is the molar ratio of $H^+$ to $M^+$ in solution, $\eta_o$ is the efficiency of the bipolar membrane and K is a constant which depends on the cation membrane and the $M^+$ ions. The experimental results in Table 1 of Example 1 recited hereinbelow support such a function of current efficiency versus $H^+/M^+$ ratio. The exact form of the function is not important to the principle of this invention; but the above relationship has been assumed for the purpose of calculation.

Figure 2:
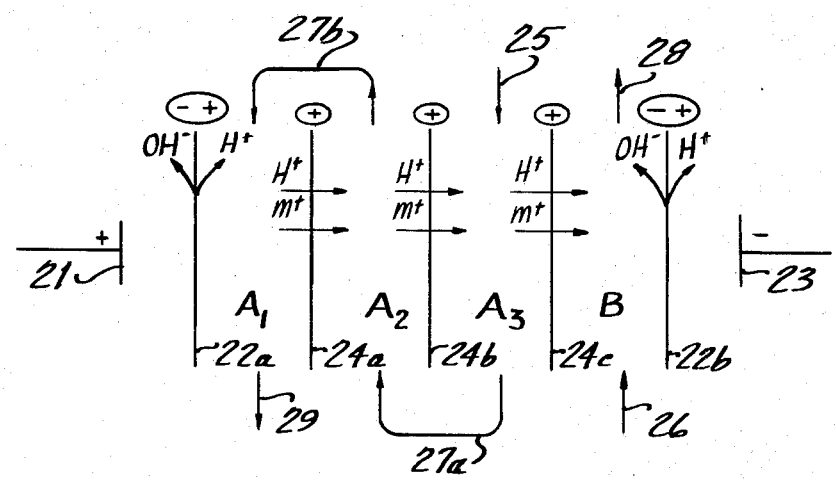
FIG. 2 schematically illustrates the ion transport in a preferred embodiment of the present invention employing two additional substantially non-porous, water-swollen cation permselective membranes.

FIG. 2 which shows a unit cell of a preferred multichamber two-compartment water splitter of the present invention. The cell shown may be considered to have three stages since there are three acid compartments, $A_1$, $A_2$ and $A_3$. The construction of a basic electrodialysis stack is well known and, for example, the units commercially available from Asahi Glass Co., 1–2, Marunochi 2-chome, Chiyoda-ku, Tokyo, Japan; Ionics, Inc., Watertown, Mass., and other commercial sources may be modified in accordance with the present invention. In general, stacks which are suitable for electrolyte concentration, such as the Asahi Model CU-IV, may be used as multichamber acid compartment-two-compartment water splitters after modification as taught by the present invention (note however, the bipolar membrane used therein must be of a kind adaptable to water splitting). While the use of bipolar membranes is preferred because of the simplicity of the equipment, the water splitting operation may be carried out by using a third compartment containing anions or cations incapable of passing through the anion and cation membranes on either side of the compartment as described, for example, in U.S. Pat. Nos. 3,704,218 and 3,705,846 (this arrangement, when used for water splitting, operates by the same principles as the bipolar membrane). The bipolar membrane or its equivalent converts water into hydrogen and hydroxyl ion. Suitable bipolar membranes are described, for example, in U.S. Pat. No. 2,829,095 (which has reference to water splitting generally); in U.S. Pat. No. 4,024,043 (single film bipolar membrane) and in U.S. Pat. No. 4,116,889 (cast bipolar membrane). Other types of bipolar membranes which effectively convert water into hydrogen and hydroxyl ions may also be employed.

The current passed through the water splitter in conventional fashion is direct current of a voltage dictated by design and performance characteristics readily apparent to the skilled artisan and/or determined by routine experimentation. Current densities between 50 and 250 amps per square foot (between 55 and 270 milliamps per square centimeter) are preferred; and current densities between 80 and 150 amps per square foot (between 85 and 165 milliamps per square centimeter) are more preferred. Higher or lower current densities are contemplated, however, for certain specific applications.

The cation permselective membrane found useful as the first cation membrane which is disposed between the acid compartment nearest the anion (FIG. 2) is a face of the bipolar membrane and the unit cell base compartment weakly or strongly acidic cation permselective membrane. Particularly useful first cation membranes are DuPont's Nafion ® acidic fluorocarbon membranes, especially Nafion ® 110, 901 and 324. Other commercially available cation membranes such as are available from Asahi Glass Co., and Ionics, Inc. may also be used.

The additional membranes positioned between cation faces of a bipolar membrane and the face of the first cation membrane thereby forming at least two acid compartments may be cation permselective or neutral membranes which are substantially non-porous (to water) and water-swollen. The term "substantially non-porous (to water)" as used herein in reference to membranes defines a membrane having a water or hydraulic permeability of no more than about 1 mL of water/dm² of membrane area per hour at 1 meter of water pressure. Lower values of hydraulic permeability, such as $1 \times 10^{-1}$ mL/dm² per hour at 1 meter of water pressure are preferred. No lower limit for hydraulic permeability has been found critical to operating of the present invention so long as the additional substantially non-porous, water-swollen cation or neutral membrane allows transport therethrough of water molecules accompanying ions under the influence of applied direct current. The term "water-swollen" as used herein with reference to membranes means water-insoluble and bibulous.

Among the cation membranes found useful as additional substantially non-porous, water-swollen cation membranes are strongly, moderately or weakly acidic cation membranes such as are described in U.S. Pat. No. 3,925,332 (Naito et al.). Among the useful commercially available membranes are those from DuPont under the trade name Nafion ® (acidic fluorocarbon membranes), from Ionics, Inc., or from Asahi Glass Co. (under the trade name Selemion ® CMV strongly acidic cation permselective membranes).

The substantially non-porous, water-swollen neutral membranes useful in the present invention are non-ion selective; i.e., cation- and anion-permeable. Among the neutral membranes found useful in the present invention are: substantially non-porous, water-insolubilized, bibulous films or coatings of lower alkyl cellulose ethers such as methyl, ethyl or propyl cellulose ethers, hydroxylethyl or hydroxypropyl cellulose ethers; regenerated cellulose materials such as cellophane; polymers prepared by interpolymerizing a difunctional vinyl monomer, e.g. divinylbenzene with a non-ionic hydrophilic monomer such as vinyl ethers, vinyl alcohols, N-vinyl pyrrolidone and substituted derivatives thereof; polymers and copolymers of methyl methacrylate; polyamides such as nylons; and aromatic polyamides. Particularly useful neutral membranes includes substantially non-porous, water-insolubilized, bibulous films or coatings of the following: cellophane; hydroxylethyl cellulose, hydroxylpropyl cellulose; polyvinyl alcohol; copolymers of vinyl acetate and vinyl pyrrolidones, di and monoethylene glycol methacrylate; cross-linked hydroxyethyl methacrylate; polyelectrolyte complexes, copolymers of methyl methacrylate and glycerol methacrylate; copolymers of hydroxypropyl methacrylate and methyl methacrylate; copolymers of hydroxy propyl methacrylate and glyadyl methacrylate; copolymers of polyvinyl pyrrolidone and methylene bis-4-phenyl isocyanate and copolymers of polyvinyl pyrrolidone and styrene or divinyl benzene.

The aqueous soluble salt found useful in the present invention is selected from halides, sulfates, phosphates, cyanides or nitrates. The preferred halide is chloride but fluorides may also be used. The preferred cations are alkali metal cations and $NH_4^+$. Among the particularly useful aqueous soluble salts are sodium and potassium chloride, sulfate, phosphate and nitrate and especially NaCl, $Na_2SO_4$, KCl and $K_2SO_4$.

The operation of the three-stage or three-acid chamber, two-compartment electrodialytic water splitter of a preferred embodiment of the invention is further described by reference to FIG. 2. The aqueous soluble salt solution, for example alkali metal chloride or alkali metal sulfate or mixtures thereof, is fed via line 25 into acid chamber $A_3$. Generally, it will have a pH between 6 and 13, with basic solutions (e.g. pH 8–12) being usually those coming from a purification step in which base (e.g. carbonate or hydroxide) has been added to impure, naturally occurring salt solution to precipitate polyvalent metals such as calcium, aluminum, magnesium and the like. However, the pH of the solution fed to the first compartment is not critical.

The concentration of the aqueous soluble salt in the feed solution in line 25 may be as low as 2 weight percent for alkali metal chloride, and may be as high as the solubility of the alkali metal chloride in water. Preferably, for alkali metal chloride the salt concentration in the feed solution is between 5 weight percent (more preferably 10 weight percent) and the saturation concentration of the salt.

Preferably, the feed solution is substantially free of other cations (e.g. $Ca^{++}$, $Mg^{++}$, $Fe^{++}$ or $Fe^{+++}$) that either will migrate across the cation membrane and precipitate in the by-product alkali metal hydroxide solution or will precipitate and foul the cation membrane. In some cases it may be desirable that the feed solution free of anions be substantially (such as bromide or sulfate) other than, for example, alkali metal chloride.

The liquid fed via line 26 to the base compartments may be water alone, or may be water with any of a variety of electrolytes in it. Preferably, this liquid is neutral or basic (pH 7–14), and more preferably it is aqueous alkali metal hydroxide, e.g. sodium hydroxide of a concentration between 1 and 50 weight percent (more preferably between 5 and 25 weight percent). The desired concentration (the actual feed to the base compartments) may be achieved by recycle, staging or a combination thereof as described in more detail below. In addition, the liquid added to the base compartments may be the aqueous sodium hydroxide recycled from the base compartments.

The three acid stage two-compartment electrodialytic water splitter illustrated in FIG. 2 incorporates a plurality of unit cells each comprised of one bipolar membrane, 22a, two substantially non-porous, water-swollen cation or neutral membranes 24a, 24b, a cation permselective membrane 24c, and one bipolar membrane 22b thereby forming first acid compartment, $A_1$, second acid compartment, $A_2$, third acid compartment, $A_3$, and base compartment, B, arranged in the fashion as shown in FIG. 2 between two electrodes anode 21 and cathode 23. In operation, a direct current passage from anode 21 to the cathode 23. An aqueous soluble salt solution in line 25 (for example aqueous sodium chloride) is fed to third acid compartment $A_3$. Hydrogen ions which are generated at bipolar membrane 22a migrate through membranes 24a, 24b and 24c into base compartment B and, at the same time, metal cations such as sodium in acid compartment $A_3$ migrate through cation membrane 24c into base compartment B towards cathode 23. An aqueous soluble salt solution from $A_3$ which may be acidic, neutral or basic, preferably acidic, is removed therefrom via line 27a and fed into second acid compartment $A_2$. Hydrogen ions and metal cations in $A_1$ migrate through cation or neutral membrane 24a into second acid compartment $A_2$. An aqueous soluble salt solution produced in $A_2$ which may be neutral or acidic, preferably acidic, is removed from $A_2$ via line 27b and fed to acid compartment $A_1$. Hydrogen ions generated at bipolar membrane 22a are added to the aqueous soluble salt solution in $A_1$ and an acidified aqueous salt solution is produced in $A_1$ and withdrawn via line 29a. By addition of the intermediate acid chambers $A_1$, $A_2$ and $A_3$ which are connected in series, by lines 27a and 27b the third acid compartment $A_3$, nearest the anion face of the bipolar membrane 22b, contains the lowest acid concentration and the first acid compartment $A_1$, nearest the cation face of bipolar membrane 22a contains the highest acid concentration. This arrangement approves the efficiency for acid generation over prior art two-compartment electrodialytic water splitter illustrated in FIG. 1. By decreasing the amount of migration of hydrogen ions into the base compartment, the efficiency of producing base is increased. A liquid comprising water, preferably also comprising dilute hydroxide, is fed via line 26 into base compartment B to which hydroxide ions generated at the anion face of bipolar membrane 22b are added. An aqueous hydroxide enriched solution is removed from the base compartment B via line 28.

It is contemplated that the flow rates out of the different compartments may be the same or different for example, the flow rates or the net flow rates after recycle out of the base compartments may be considerably slower than those out of the acid compartments such that the hydroxide ion concentration in the product withdrawn from base compartments B is substantially greater than the acid concentration in the acidified aqueous salt solution withdrawn from the acid compartment $A_1$. It is also contemplated that the flow rates may be adjusted such that the hydrogen ion concentration in the acidified aqueous salt withdrawn from $A_1$ is greater than the hydroxide ion concentration in the hydroxide enriched solution removed from the base compartment B.

Figure 3:
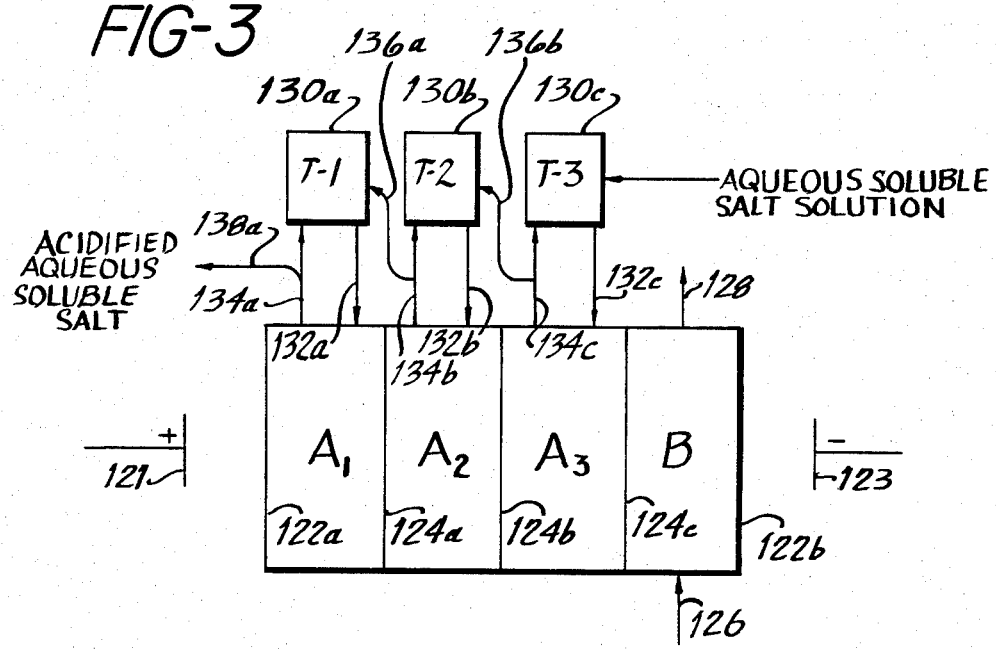
FIG. 3 schematically illustrates the stream flows for a preferred embodiment of the present invention employing a three acid stage, two-compartment multichamber electrodialytic water splitter.

FIG. 3 illustrates another preferred embodiment of the process of the present invention. A feed/bleed apportionment method is used for feeding and withdrawing the aqueous soluble salt from acid compartments $A_1$, $A_2$ and $A_3$. Aqueous soluble salt solution from a tank 130c (T-3) is fed via line 132c to third acid compartment $A_3$. Aqueous soluble salt solution which may be neutral, basic or acidic, preferably acidic, is removed from $A_3$ via line 134c. At least a portion of the aqueous soluble salt solution in line 134c is fed, via line 136b, to tank (T-2). The remainder of the aqueous soluble salt solution in line 134c is returned to tank T-3. While the composition of the aqueous soluble salt solution in lines 132c, 134c and 136b may be the same, it is preferable that the pH of the aqueous soluble salt solution in line 136b be more acidic than that of the aqueous soluble salt solution in line 132c. Aqueous soluble salt solution from tank T-2 is fed via line 132b to the second acid compartment $A_2$. Aqueous soluble salt solution from acid compartment $A_2$ is removed via line 134b. At least a portion of the aqueous soluble salt solution in line 134b is forwarded via line 136a to tank 130a (T-1). The remainder of the aqueous soluble salt solution which is preferably acidic is forwarded via line 134b back to tank T-2. Aqueous soluble salt solution in line 132a is fed to first acid compartment $A_1$ and an acidified aqueous salt solution is removed from $A_1$ via line 134a. At least a portion of the acidified aqueous soluble salt solution in line 134a is removed via line 138a and the remainder returned to tank T-1. In all other respects, the operation of the three acid stage two-compartment electrodialytic water splitter illustrated in FIG. 3 is the same as that described in reference to FIG. 2.

FIG. 4 illustrates another preferred embodiment of the present invention employing a two acid stage two-compartment electrodialytic water splitter for production of acidified aqueous sodium sulfate. Aqueous sodium sulfate is fed via line 231 to tank 230 and, in turn, from tank 230 via line 232 to second acid compartment $A_2$ formed by a face of a substantially non-porous, water-swollen cation or neutral membrane 224a and a face of a cation permselective membrane 224b. Under the influence of direct applied current through anode 221 and cathode 223, hydrogen ions and sodium ions migrate from first acid compartment $A_1$ toward base compartment B. As a result an acidified aqueous sodium sulfate solution is produced in acid compartment $A_2$, removed via line 234 and supplied to tank 230. At least a portion of the acidified sodium sulfate solution from $A_2$ is removed via line 236 and fed to line 238 for forwarding along with acidified sodium sulfate from tank 242, to first acid compartment $A_1$ formed by a cation face of bipolar membrane 222a and a face of the substantially non-porous, water-swollen cation or neutral membrane 224a. The acidified sodium sulfate solution produced from hydrogen ions formed in the cation face of bipolar membrane 222a is removed from first acid compartment $A_1$ via line 240 and supplied to tank 242. At least a portion of the acidified aqueous sodium sulfate solution is removed from tank 242 via line 244. The operation of the base compartment in FIG. 4 is analogous to that of the base compartments in FIGS. 2 and 3.

Figure 5:
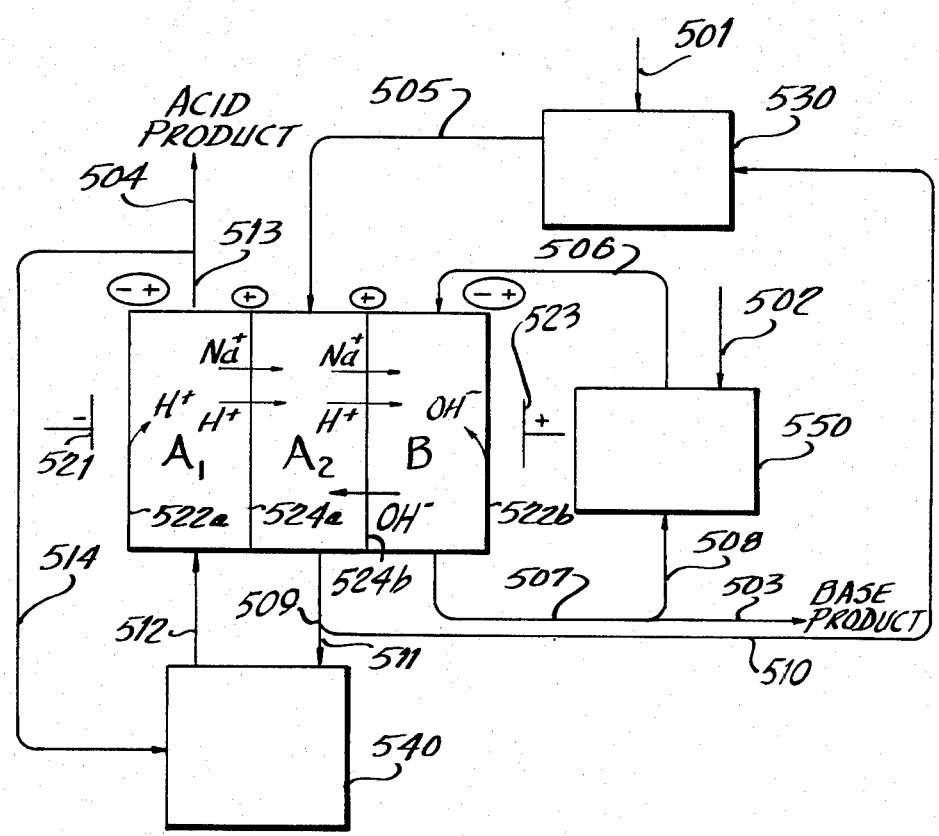
FIG. 5 schematically illustrates still another preferred embodiment of the present invention employing a two acid stage, two-compartment multichamber electrodialytic water splitter.

FIG. 5 illustrates still another preferred embodiment of the present invention employing a two acid stage two-compartment electrodialytic water splitter for production of acidified aqueous sodium sulfate. Aqueous sodium sulfate is fed via line 501 to tank 530 and via line 505 to acid compartment $A_2$ formed by a face of a substantially non-porous, water-swollen cation or neutral membrane 524a and a face of a cation permselective membrane 524b. Under the influence of direct applied current through anode 521 and cathode 523, hydrogen ions and sodium ions migrate toward the base compartment B and hydroxide ions migrate toward acid compartment $A_2$. Acidified aqueous sodium sulfate solution is produced in acid compartment $A_2$ and at least a portion of this solution is removed via line 509 and fed back to tank 530 via line 510. The remainder of the acidified sodium sulfate solution from $A_2$ removed via lines 509 is fed to line 511 to supply tank 540. The acidified aqueous sodium sulfate solution is removed from tank 540 via line 512 and forwarded to first acid compartment $A_1$ formed by a cation face of bipolar membrane 522a and a face of the substantially non-porous, water-swollen cation or neutral membrane 524a. A more acidified sodium sulfate solution is formed by hydrogen ions introduced at the cation face of bipolar membrane 522a and this solution is removed from first acid compartment $A_1$ via lines 513 and 504. At least a portion of the more acidified aqueous sodium sulfate solution removed from acid compartment $A_1$ via line 513 is recirculated to tank 540 via line 514. With respect to the base cycle, water is added via line 502 to base recirculation tank 550. An aqueous sodium hydroxide solution in recirculation tank 550 is removed via line 506 and fed to base compartment B wherein hydroxide ions from an anion face of bipolar membrane 522b are introduced and combine with sodium ions that migrate through cation membrane 524b from acid compartment $A_2$. A sodium hydroxide-enriched solution is produced in the base compartment B and is removed via line 507. At least a portion of the solution in line 507 is recycled to tank 550 via line 508 and the remainder is removed from line 507 via line 503 as product.

The multichamber acid compartment two-compartment electrodialytic water splitters of the present invention may be operated at any temperature between about 20° C. and 80° C., but more practically and conveniently between about 35° C. and 55° C. In the embodiment of the present invention illustrated in FIG. 4, we prefer to maintain temperatures of at least about 40° to about 55° in the electrodialytic stack; the overall current efficiency is improved by about 2 percent compared to operating with aqueous sodium sulfate in the acid loop at temperatures less than about 40° C., for example, about 35° C.

Preferred embodiments of the present invention illustrated in FIGS. 2 and 3 incorporate three stages by disposing two substantially non-porous, water-swollen cation or neutral membranes in the acid compartment. FIGS. 4 and 5 incorporate two stages or two acid compartments by disposing only a single substantially non-porous, water-swollen cation or neutral membrane in the acid compartment. The number of stages that may be incorporated into the acid compartment is not critical and may be varied from at least two up to about ten so long as the solution of lowest acidity enters the acid compartment closest of the anion faces of the bipolar membranes and flows serially to the acid compartment closest to the cation faces of the bipolar membranes, wherein a solution of highest acidity is produced. If there is only one stage, the water splitter will be an ordinary two-compartment water splitter as illustrated in FIG. 1.

Figure 6:
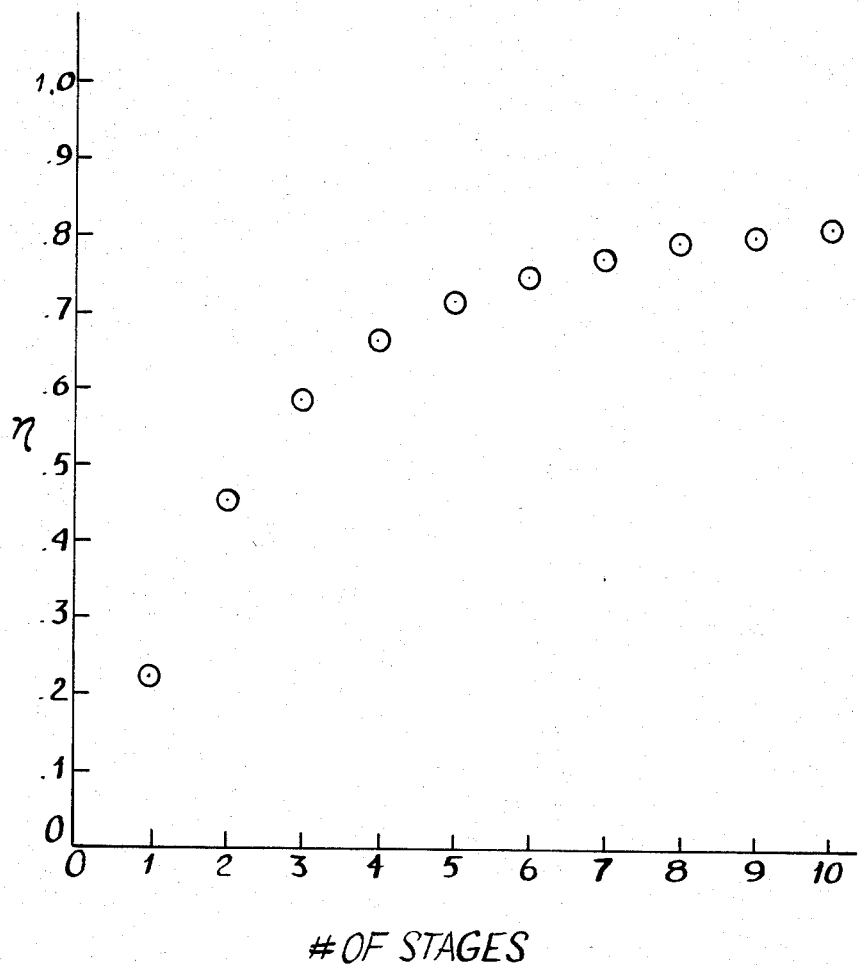
FIG. 6 graphically displays the improvement in current efficiency which occurs as the number of acid stages is increased.

FIG. 6 graphically illustrates the improvement in efficiency which occurs as the number of stages is increased in the NaCl/HCl system using hypothetical cation membranes of perfect cation permselectivity a K value as defined in equation (1), of 3.5 and a perfectly selective bipolar membrane. It has also been assumed for the purpose of calculation that the composition in the previous acid compartment is the same as that fed to the next acid compartment; i.e., in FIG. 3 the composition of solution in line 132b (fed for $A_2$) is the same as the composition of solution removed from acid compartment $A_3$ (this is done to illustrate the increase in efficiency which might be expected as the number of stages is increased). For actual systems, an elementary mass balance can be done using experimentally determined values for the transport numbers across each membrane. Thus, the water splitter having one stage corresponds to that of FIG. 1; the water splitter having two stages corresponds to that of FIG. 4; and the water splitter having three stages corresponds to that of FIGS. 2 and 3. As the number of stages is increased, the gain in efficiency by adding another stage decreases. Since power consumption and the complexity of equipment increase with an increasing number of stages, the most practical multichamber units probably consist of two or three acid stages. Similar results are expected using neutral membranes (as the membranes separating the acid compartments) and other salts.

FIG. 7 graphically illustrates variation in the overall current efficiency to be expected in the NaCl/HCl system with increasing conversion of NaCl to HCl, using the one stage prior art two-compartment water splitter illustrated in FIG. 1 as calculated from equation Eq. (1) for several values of K where $\eta_o = 1$. A membrane which does not selectively transport H+ compared to salt cations exhibits a value of K=1. Nafion ® type membranes typically exhibit a value for K of about 3.5 for NaCl/HCl systems; Asahi Glass Selemion ® CMV type membranes normally exhibit a K of about 7 in NaCl/HCl systems. Generally, use of cation membranes exhibiting values of K less than about 3-4 is particularly desirable. It has been assumed in these calculations that each of the cation membranes is perfectly permselective.

FIG. 8 graphically illustrates the variation in the overall current efficiency to be expected in the NaCl/HCl system using the hypothetical membranes described in reference to FIGS. 6 & 7. Note the increasing conversion of NaCl to HCl using the two stage multichamber two-compartment water splitter of the present invention such illustrated in FIG. 4, as calculated for the same values of K and for $\eta_o = 1$, as compared to the data illustrated in FIG. 7.

FIG. 9 graphically illustrates the variation in the overall current efficiency to be expected in the NaCl/HCl system. Note the increasing conversion of NaCl to HCl using the three stage multichamber two-compartment water splitter of the present invention such as illustrated in FIGS. 2 and 3, calculated for the same values of K and for $\eta_o = 1$, as compared to the data illustrated in FIGS. 7 and 8.

In FIGS. 7-9, the conversion refers to the fraction of M+ input to the system which has been replaced. Thus, if 100 moles of NaCl is introduced and the output is 40 moles of HCl and 60 moles of NaCl, the conversion will be 0.4. As can be seen from inspection of the figures, the efficiency is higher for two and three-stage multichamber two-compartment water splitting that it is for ordinary two-compartment water splitting (one stage). Similar results are expected using other cation or even neutral membranes and other salts such as $Na_2SO_4/H_2SO_4$, $K_2SO_4/H_2SO_4$, $NaNO_3/HNO_3$ or $NaHPO_4/H_3PO_4$.

Figure 10:
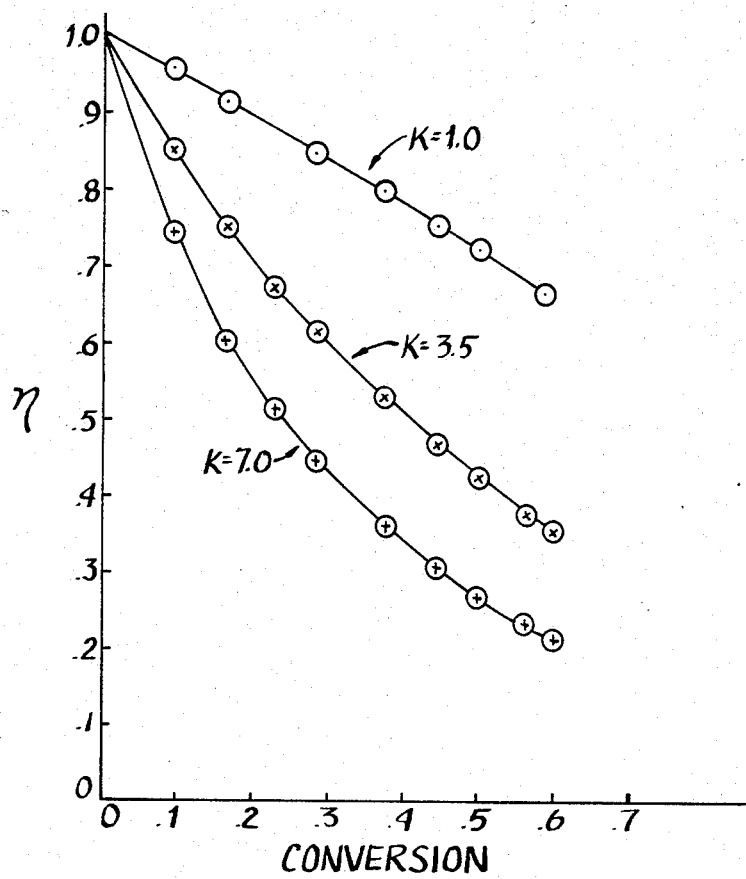
FIG. 10 graphically displays the variation of overall current efficiency versus increasing percent conversion for the prior art two-compartment electrodialytic water splitter illustrated in FIG. 1 and operated in a batch recirculation (infinite staging) mode.

The efficiency of the two-compartment water splitter such as illustrated in FIG. 1 may be improved by conventional staging. In conventional staging, only a portion of the process is operated at the final high conversion and low efficiency. An efficient staging method is a batch recirculating mode in which a tank of salt solution containing no acid at the start would be introduced into a water splitter, the acidified output of the water splitter returned to the tank, and the cycling continued until the desired degree of conversion had been reached. The calculated overall efficiency for such a batch recirculation method is shown in FIG. 10 for three values of K determined from Eq. (1). Comparison of FIG. 10 and FIGS. 8 and 9 show that the multichamber systems of the present invention have an advantage in efficiency under most conditions. In addition, batch recirculation is frequently undesirable in most chemical processes where a continuous stream of product is needed. For conventional staging in a continuous process, the efficiency will be somewhat less than that shown in FIG. 10 and the multichamber method will have a larger advantage.

Figure 11:
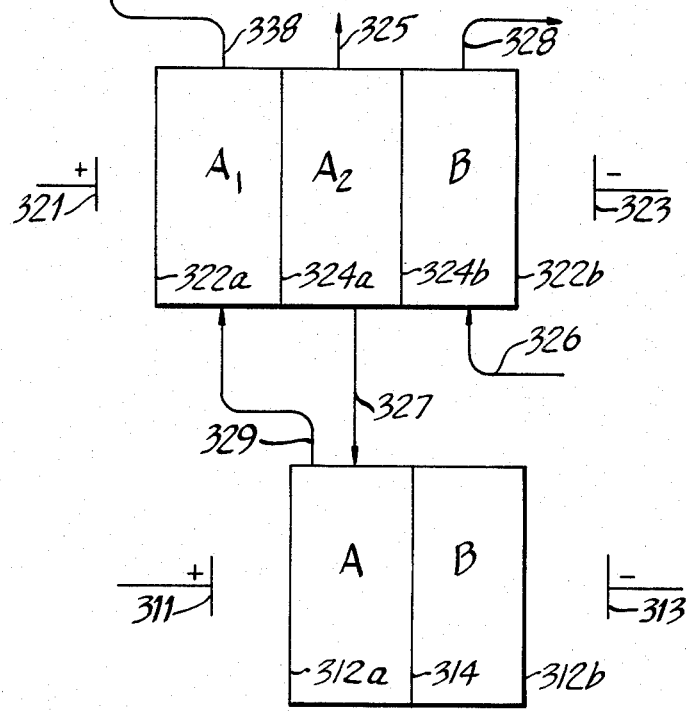
FIG. 11 schematically illustrates another preferred embodiment of the present invention illustrated in FIG. 4 in combination with a prior art two-compartment electrodialytic water splitter.

It is also possible to use the multichamber method in conjunction with conventional two-compartment water splitting advantageously. In this arrangement, one of the intermediate streams from the multichamber unit can be introduced into an ordinary two-compartment water splitter with the product from the two-compartment water splitter being reintroduced into the multichamber unit. An example of such an arrangement is shown in FIG. 11. Aqueous soluble salt is supplied via line 325 to acid compartment $A_2$ of a two stage two-compartment water splitter. The product solution formed in acid compartment $A_2$, preferably acidic, is removed via line 327 and supplied to acid compartment A of a conventional two-compartment water splitter. The acidified product formed in acid compartment A is removed via line 329 and supplied to acid compartment $A_1$ of the two stage two-compartment water splitter. A more acidified aqueous soluble salt is formed in acid compartment $A_1$ and removed via a line 338. The design of the two stage two-compartment water splitter is the same as described with reference to FIG. 4 (the reference numerals have been changed from the 200 series in FIG. 4 to the 300 series in FIG. 11). Similarly, the design of the two-compartment water splitter is the same as described with reference to FIG. 1 (with reference numerals in FIG. 1 being prefixed with the number 3 in FIG. 11).

EXAMPLE 1

This example illustrates the decrease in the current efficiency for production of H+ in an aqueous NaCl solution in the acid compartment of the prior art two-compartment electrodialytic water splitter shown in FIG. 1. The following solutions were fed to the water splitter: 0.5M $Na_2SO_4$ to the anode and cathode compartments, 3.400M NaCl to the acid compartment A and 1 molar NaCl to the base compartment B.

The H+ produced by a bipolar membrane 12a is introduced into the salt solution fed to acid compartment A via line 25 so that an acidified salt solution is produced. The efficiency of the process is determined in part by the ratio of H+ and M+ crossing the cation membrane 14. As the acidity of the salt solution is increased, more and more of the current will be carried across the cation membrane by H+ causing a reduction in efficiency for acid and base production. The efficiency of the system may follow the following function:

$$\frac{1}{\eta} = \frac{K}{\eta_o} R + \frac{1}{\eta_o} \qquad \text{Eq. (1)}$$

Where $\eta$ is the current effiency for M+ transport, R is the molar ratio of H+ to M+ in solution, $\eta_o$ is the efficiency of the bipolar membrane and K is a constant which depends on the cation membrane and the M+ ions. The experimental results summarized in Table 1 show that such a function applies in the NaCl/HCl system operated in the prior art two-compartment water splitter of FIG. 1. In this case, the cation membrane was a Nafion ® 110 (DuPont).

TABLE I

Current Efficiency for NaCl/HCl System Operated in FIG. 1

| mMOLS/g HCl | mMOLS/g NaCl | $\eta$ | $\eta$ calc* |
|---|---|---|---|
| .0350 | 3.400 | .937 | .929 |
| .0791 | 3.376 | .873 | .893 |
| .1173 | 3.355 | .864 | .864 |
| .1808 | 3.319 | .822 | .819 |
| .2509 | 3.277 | .772 | .773 |
| .3044 | 3.244 | .739 | .740 |
| .3430 | 3.219 | .719 | .718 |

*$\eta$ calc for $\eta_o$ = .959 & K = 3.148

COMPARATIVE EXAMPLE 2

Application of Multichamber Two-Compartment Water Splitting to Aqueous Na₂SO₄

A comparison of a prior art two-compartment electrodialytic water splitter with a preferred embodiment of the present invention systems for producing acidified Na₂SO₄ is made. Method 1 is a prior art two-compartment water splitter of FIG. 1 operated in a batch recirculation mode from zero conversion to a final conversion. The conversion, C, is defined as:

$$C = \frac{2 \times \text{moles } H_2SO_4}{\text{moles } H_2SO_4 + \text{moles } Na_2SO_4}$$

A conversion of 1 therefore corresponds to a solution of NaHSO₄. Batch recirculation of the acid corresponds to an inifinite number of feed and bleed stages. A continuous process employing three stages would be slightly less efficient. Method 2 involves feeding a solution of salt to the second compartment A₂ of the two acid compartments cell illustrated in FIG. 4 with the output to the second compartment A₂ being fed to the first compartment A₁ as shown in FIG. 4. For the purpose of calculation, it is assumed that the second compartment A₂ is operated at the conversion fed to the first compartment, A₁, and the first compartment A₁ at the conversion of the final product.

Figure 13:
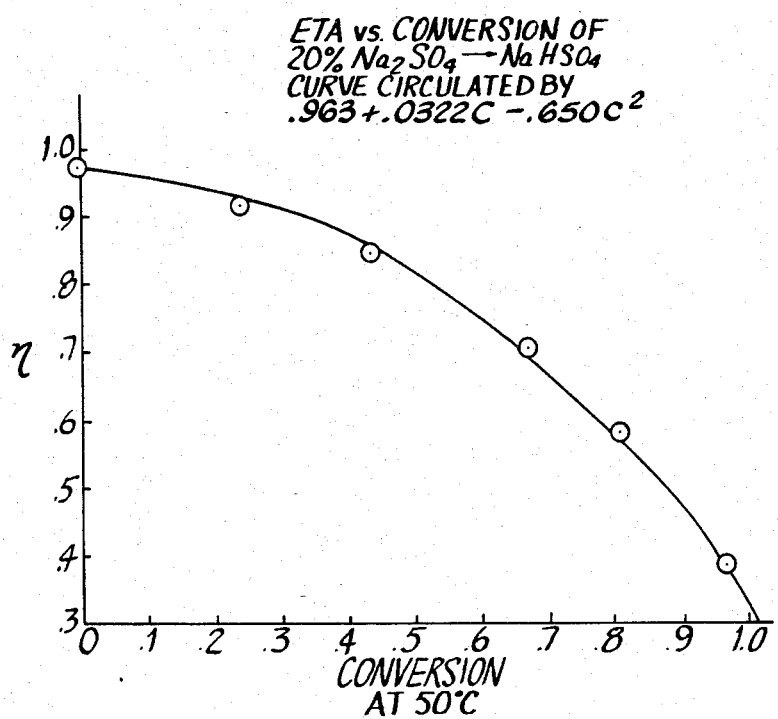
FIG. 13 is a graph of current efficiency as a function of conversion for the production of $H_2SO_4$ in $Na_2SO_4$.

The efficiency for generating H₂SO₄ in Na₂SO₄ as a function of conversion using a partially sulfonated polytyrene cation membrane and a bipolar membrane prepared as described in U.S. Pat. No. 4,116,889 was determined at a current density of 109 ma/cm² at 50°. The results are shown in Table II. The experimental data have been used to develop a quadratic equation (see footnote b) which approximates the experimental results fairly well. See Table II and FIG. 13.

Figure 12:
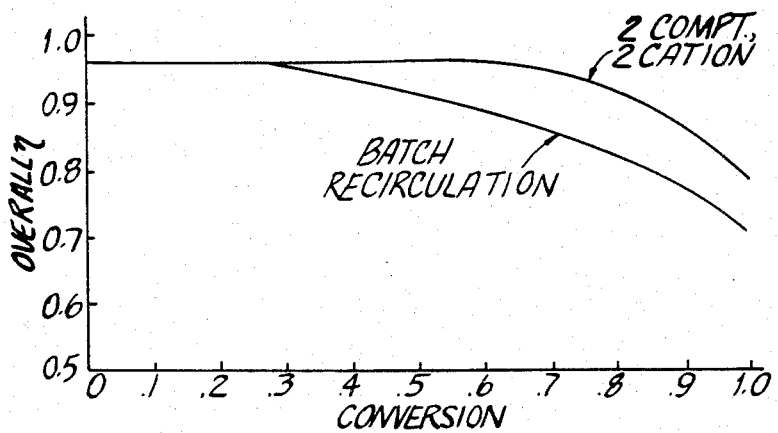
FIG. 12 graphically illustrates a comparison of the overall current efficiency versus percent conversion for the two acid stage two-compartment multichamber electrodialytic water splitter illustrated in FIG. 4 and for a prior art two-compartment electrodialytic water splitter illustrated in FIG. 1 operated in infinite batch recirculation mode.

Calculations of the average efficiency which would be observed at various stages of conversion by the batch recirculation method and the efficiency observed for the cation membrane cell illustrated in FIG. 4 operated at various conversions at 50° C. were made. The results are summarized in Tables IIIa and b and shown graphically in FIG. 12.

The results indicate that at conversions above 50 percent, the two cation membrane cell of FIG. 4 has significantly higher efficiency than the regular two-compartment cell. The two cation membrane cell is, however, somewhat more complex than the conventional two-compartment cell and would operate at a "somewhat" higher voltage.

TABLE II

Conversion and Current Efficiency Data for Conversion of >20% Na₂SO₄ into NaHSO₄ in EDWS of FIG. 4$^a$ Operated at 50° C., and a Current Density of 100 amp/ft²

| Conversion (C) of Na₂SO₄ to NaHSO₄ C$^a$ | Current Efficiency for Conversion of Na₂SO₄ to NaHSO₄ | |
|---|---|---|
| | $\eta$ | $\eta$ calc$^b$ |
| 0 | .971 | .963 |
| .241 | .920 | .933 |
| .435 | .850 | .854 |
| .669 | .706 | .694 |
| .804 | .577 | .569 |
| .964 | .381 | .390 |

$^a$conversion = 2 × moles H₂SO₄/moles of H₂SO₄ + moles of Na₂SO₄
$^b\eta$ calc = 0.962901 + 0.0322 C − 0.650 C²

TABLE IIIa

Batch Recirculation in Cell Illustrated in FIG. 1

| Conversion (C) of Na₂SO₄ to NaHSO₄ C$^a$ | Current Efficiencies Calculated for Conversion of Na₂SO₄ to NaHSO₄ at 50° C. $\eta$ calc for Batch of FIG. 12 |
|---|---|
| 0 | .963 |
| .10 | .962 |
| .20 | .957 |
| .30 | .948 |
| .40 | .934 |
| .50 | .914 |
| .60 | .890 |
| .70 | .858 |
| .80 | .819 |
| .90 | .769 |
| 1.00 | .705 |

TABLE IIIb

Two Cation Membrane - Two Acid Compartment Cell of FIG. 4

| Conversion (C) of Na₂SO₄ to NaHSO₄ C$^a$ | Current Efficiency Calculated for Conversion of Na₂SO₄ to NaHSO₄ at 50° $\eta$ calc |
|---|---|
| .10 | .963 |
| .2 | .963 |
| .3 | .963 |
| .4 | .963 |
| .5 | .962 |
| .6 | .956 |
| .7 | .942 |
| .8 | .915 |
| .9 | .864 |
| 1 | .779 |

COMPARATIVE EXAMPLE 3

Figure 14:
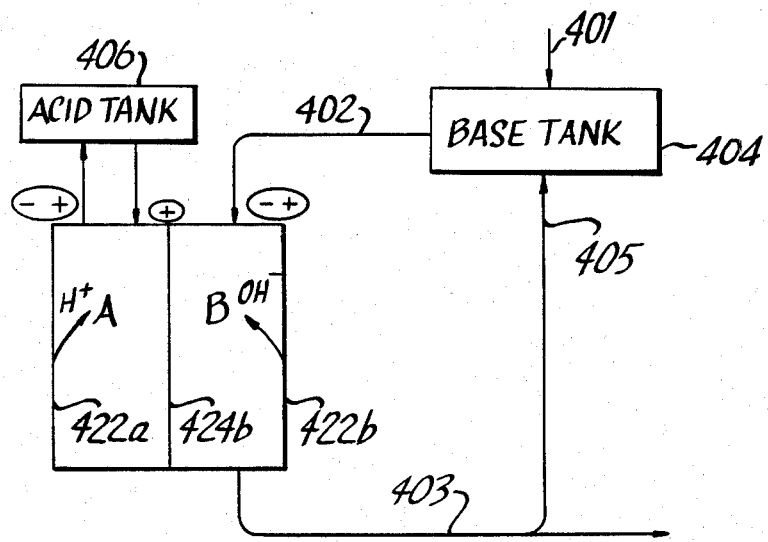
FIG. 14 schematically illustrates the operation of another two-compartment electrodialytic water splitter of the prior art.

The current efficiency ($\eta$ calc=0.712) for producing NaHSO₄ in Na₂SO₄ at 45° C. in a prior art two-compartment water splitter illustrated in FIG. 14. As shown, aqueous salt solution in tank 406 is cycled through the acid compartment to increase the acidity of the solution. A solution comprising water is fed via line 401 to a base tank 404. The base tank 404, also containing base supplied from the base compartment B via lines 403 and 405, feeds the base compartment B via a line 402. The base cycle is repeated to increase base production with some product being removed from the cycle, if desired. The design of the two-compartment water splitter is the same as depicted in FIG. 1 (with the reference numerals in FIG. 1 being prefixed with the number 4 in FIG. 14). The current efficiency of the batch recirculation method of FIG. 14 is compared with the current efficiency ($\eta$ calc=0.811) for producing NaHSO₄ in Na₂SO₄ at 45° C. in the two stage two-compartment water splitter illustrated in FIG. 5. The electrodialytic water splitters illustrated in FIGS. 5 and 14 are identical except that in FIG. 5 an additional cation membrane (524a) is inserted between the cation face of bipolar membrane 522a and a face of cation membrane 524b, whose other faces form part of base compartment B. The water splitters illustrated in FIGS. 13 and 14 each contain 100 unit cells; each compartment measures 96.4 cm×96.4 cm×0.127 cm. An applied current of 1000 amp, a temperature of 45° C. and a flow rate of 5 cm/sec are used for FIGS. 13 and 14. The efficiency for Na+ transport across the cation membranes of FIGS. 5 and 14 is calculated from the following quadratic equation $$\eta_{Na^+} = 9.629 - 0.3741C - 0.5879C^2 \quad (15)$$

where C is the same as defined in Example 2. (The equation is based on results summarized in Table IV). The efficiency of the bipolar membranes is assumed to be 0.97 (3% loss of efficiency due to migration of sulfate through bipolar from acid to base) and the loss of hydroxide ion through the cation membranes is assumed to be 10% of the current.

TABLE IV

| Conversion (C) of Na$_2$SO$_4$ to NaHSO$_4$[a] | Current Efficiency for Conversion of Na$_2$SO$_4$ to NaHSO$_4$ at 45° C. | |
|---|---|---|
| C[a] | $\eta$ | $\eta$ calc[c] |
| 0 | .970 | .962 |
| .247 | .902 | .917 |
| .425 | .842 | .840 |
| .66 | .695 | .682 |
| .797 | .559 | .559 |
| .968 | .371 | .375 |

[c] $\eta$ calc = 0.962901 − 0.374134 C − 0.587934 C$^2$

The mass flow balance for streams in FIGS. 5 and 14 given in Tables V and VI, respectively, is provided to illustrate the advantages of our novel process and apparatus but does not necessarily reflect optimum or realizable conditions for the operation of the process of the present invention.

TABLE V

Mass Flows[1] for Batch Recirculation in Water Splitter Illustrated in FIG. 14

| Stream[2] | Na$_2$SO$_4$ | NaOH | H$_2$SO$_4$ | H$_2$O | Total |
|---|---|---|---|---|---|
| 401 | 0 | 0 | — | 272.38 | 272.38 |
| 402 | 218.5 | 2543.9 | — | 23349.9 | 26112.3 |
| 403 | 227.6 | 2650.1 | — | 23622.3 | 26500 |
| 404 | 9.1 | 106.2 | — | 946.6 | 1061.9 |
| 405 | 218.5 | 2543.9 | — | 22675.8 | 25438.2 |
| 406[3] | 461.5 | — | 0 | 1384.5 | 1846 |
| 406[4] | 237.5 | — | 148.3 | 1057.6 | 1443.4 |

Footnotes
[1] Base flow rate in Kg/hr; T = 45° C., current = 1000 amps.
[2] During the period of the cycle of the acid tank, the base composition will fluctuate. Thus, average values are given.
[3] Amounts (Kg) charged to tank 406 at beginning of experiment.
[4] Amounts (Kg) contained in acid tank 406 after running experiment for 1 hour, 8.4 minutes.

Based on the data given in Table V and the assumptions detailed hereinabove, the current efficiency ($\eta$ calc) was calculated to be 0.712 for the prior art water splitter illustrated in FIG. 14.

TABLE VI

Mass Flows[1] for Two Stage Two-Compartment Multichamber Water Splitter of FIG. 5

| Stream | Na$_2$SO$_4$ | H$_2$SO$_4$ | NaOH | H$_2$O | Total |
|---|---|---|---|---|---|
| 501 | 460.5 | 0 | 0 | 1381.6 | 1842.1 |
| 502 | 0 | 0 | 0 | 788.6 | 788.6 |
| 503 | 7.9 | 0 | 121.1 | 1081.7 | 1210.7 |
| 504 | 237.7 | 148.3 | 0 | 1034.0 | 1420.0 |
| 505 | 5643.3 | 1118.9 | 0 | 19737.8 | 26500.0 |
| 506 | 165.9 | 0 | 2528.9 | 23383.0 | 26077.8 |
| 507 | 173.8 | 0 | 2650.0 | 23676.2 | 26500.0 |
| 508 | 165.9 | 0 | 2528.9 | 22594.5 | 25289.3 |
| 509 | 5533.6 | 1194.6 | 0 | 19598.7 | 26326.9 |
| 510 | 5182.8 | 1118.9 | 0 | 18356.3 | 24658.0 |
| 511 | 350.8 | 75.7 | 0 | 1242.5 | 1669.0 |
| 512 | 4548.7 | 2693.8 | 0 | 19505.3 | 26747.8 |
| 513 | 4435.6 | 2766.4 | 0 | 19296.9 | 26498.9 |
| 514 | 4197.9 | 2618.1 | 0 | 18262.8 | 25078.8 |

Footnotes
[1] Mass flow rates in Kg/hr.; Temperature = 45° C.; and current = 1000 amps.

Based on the data given in Table VI and the assumptions detailed hereinabove, the current efficiency ($\eta$ calc) was calculated using the method of Example 2 to be 0.811 for the water splitter of the present invention illustrated in FIG. 5.

We claim:

1. A method for generating an acidified solution and an aqueous base comprising the steps of:
   (a) providing an electrodialytic water splitter comprising at least one unit cell, said at least one unit cell having at least a first acid compartment, a second acid compartment and a base compartment arranged such that the base compartment and first acid compartment are defined in part by a common first membrane and such that the first acid compartment and the second acid compartment are defined in part by a common second membrane, disposed between an anode and a cathode;
   (b) introducing a liquid comprising water to the base compartment;
   (c) introducing a liquid comprising an aqueous soluble salt to the first acid compartment;
   (d) withdrawing liquid from the first acid compartment and transferring at least a portion of the liquid from the first acid compartment to the second acid compartment;
   (e) passing direct current through said electrodialytic water splitter to produce a liquid comprising aqueous base in said base compartment, a liquid comprising aqueous soluble salt and a first concentration of hydrogen ions in said first acid compartment, and a liquid comprising aqueous soluble salt and a second concentration of hydrogen ions in said second acid compartment, said second concentration of hydrogen ions being greater than said first concentration of hydrogen ions;
   (f) withdrawing a liquid comprising aqueous base from the base compartment; and
   (g) withdrawing the liquid comprising aqueous soluble salt and a second concentration of hydrogen ions from said second acid compartment.

2. The method of claim 1 wherein the first membrane is a cation permselective membrane.

3. The method of claim 1 wherein the second membrane is a substantially non-porous, water-swollen, non-anion permselective membrane.

4. The method of claim 3 wherein the base compartment is further defined by means for introducing a source of hydroxide ions to the base compartment, and said second acid compartment is further defined by means for introducing a source of hydrogen ions to said second acid compartment.

5. The method of claim 4 wherein the means for introducing hydroxide ions is an anion face of a bipolar membrane, and wherein the means for introducing hydrogen ions is a cation face of a bipolar membrane.

6. The method of claim 1 wherein the unit cell further comprises a third acid compartment arranged such that the second acid compartment and the third acid compartment are defined in part by a common third membrane and further comprising the steps of transferring the liquid comprising soluble salt and a second concentration of hydrogen ions from said second acid compartment to the third acid compartment wherein the passage of current through said electrodialytic water splitter produces a liquid comprising aqueous soluble salt and a third concentration of hydrogen ions, said third concentration of hydrogen ions being greater than said second concentration of hydrogen ions, and withdrawing the liquid comprising aqueous soluble salt and a third concentration of hydrogen ions from said third acid compartment.

7. The method of claim 1 further comprising the step of recycling a portion of liquid withdrawn from each acid compartment back to the acid compartment from which the liquid was withdrawn.

8. The method of claim 1 wherein the transferring step further comprises feeding liquid from the first acid compartment through an acid compartment of a second electrodialytic water splitter prior to supplying liquid to the second acid compartment.

9. The method of claim 3 wherein the non-porous, water-swollen, non-anion permselective membrane is a non-porous, water-swollen, cation permselective membrane.

10. The method of claim 3 wherein the non-porous, water-swollen, non-anion permselective membrane is a non-porous, water-swollen neutral membrane.

11. An apparatus for producing an acidified solution and an aqueous base comprising;
    (a) a container;
    (b) two electrodes disposed in said container;
    (c) at least one unit cell disposed in said container and arranged between said two electrode, said at least one unit cell comprising, in series:
        (1) first means for splitting water into hydrogen ions and hydroxide ions comprising a cation permselective membrane portion;
        (2) at least one substantially non-porous, water-swollen, non-anion permselective membrane arranged opposite said cation permselective membrane portion and spaced therefrom;
        (3) a cation permselective membrane spaced from said non-porous, water swollen, non-anion permselective membrane; and
        (4) second means for splitting water into hydrogen ions and hydroxide ions comprising an anion permselective membrane portion arranged opposite and spaced from the cation permselective membrane.

12. The apparatus of claim 11 wherein the non-porous, water-swollen, non-anion permselective membrane is a cation permselective membrane.

13. The apparatus of claim 11 wherein the non-porous, water-swollen, non-anion permselective membrane is a neutral membrane.

14. The apparatus of claim 11 wherein said first and second means are bipolar membranes.

15. The apparatus of claim 11 further including means associated with said container for supplying liquid from a compartment defined by the cation permselective membrane and the non-porous, water-swollen, non-anion permselective membrane to a compartment defined by said first means and said non-porous, water-swollen, non-anion permselective membrane.

16. The apparatus of claim 11 wherein the unit cell further comprises at least one additional non-porous, water swollen, non-anion permselective membrane disposed between said first means and said cation membrane to define at least one additional compartment therebetween.

17. A unit cell for use in an apparatus for forming acidified solution and an aqueous base, said unit cell comprising, in series:
    a first bipolar membrane comprising a cation permselective membrane portion;
    at least one non-porous, water-swollen, non-anion permselective membrane arranged opposite to and spaced from adjacent said cation permselective membrane portion of the first bipolar membrane;
    a cation permselective membrane arranged opposite to and spaced from said non-porous, water-swollen anion permselective membrane; and
    a second bipolar membrane comprising an anion permselective membrane portion arranged opposite to and spaced from the cation permselective membrane.

18. A unit cell for use in an apparatus for producing an acidified solution and an aqueous base comprising:
    first means for splitting water into hydrogen ions and hydroxide ions comprising a cation permselective membrane portion;
    at least one substantially non-porous, water swollen, non-anion permselective membrane arranged opposite said cation permselective membrane portion and spaced therefrom;
    a cation permselective membrane spaced from said non-porous, water-swollen, non-anion permselective membrane; and
    second means for splitting water into hydrogen ions and hydroxide ions comprising an anion permselective membrane portion arranged opposite and spaced from the cation permselective membrane.

* * * * *